(12) United States Patent
Matsuo et al.

(10) Patent No.: US 7,978,661 B2
(45) Date of Patent: *Jul. 12, 2011

(54) MULTI-CARRIER COMMUNICATION DEVICE AND MULTI-CARRIER COMMUNICATION METHOD

(75) Inventors: Hidenori Matsuo, Kanagawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,238

(22) Filed: Jul. 19, 2010

(65) Prior Publication Data

US 2010/0285805 A1      Nov. 11, 2010

Related U.S. Application Data

(63) Continuation of application No. 11/909,404, filed as application No. PCT/JP2006/306172 on Mar. 27, 2006, now Pat. No. 7,782,821.

(30) Foreign Application Priority Data

Mar. 28, 2005 (JP) ................................. 2005-090814

(51) Int. Cl.
*H04Q 7/00* (2006.01)
(52) U.S. Cl. ......... 370/334; 370/344; 455/439; 375/269
(58) Field of Classification Search .................. 370/329, 370/331, 332, 334, 344; 455/436, 439; 375/268, 375/269
See application file for complete search history.

(56) References Cited

U.S. PATENT DOCUMENTS

| 6,021,123 | A  | * | 2/2000 | Mimura ........................ 370/331 |
| 6,038,450 | A  |   | 3/2000 | Brink |
| 6,947,408 | B1 |   | 9/2005 | Liberti |
| 7,230,942 | B2 |   | 6/2007 | Laroia |
| 7,257,410 | B2 |   | 8/2007 | Chun |
| 7,782,821 | B2 | * | 8/2010 | Matsuo et al. ................ 370/334 |

(Continued)

FOREIGN PATENT DOCUMENTS

JP          10-051836          2/1998

(Continued)

OTHER PUBLICATIONS

PCT International Search Report dated May 23, 2006.

(Continued)

*Primary Examiner* — Nhan Le
(74) *Attorney, Agent, or Firm* — Dickinson Wright PLLC

(57) ABSTRACT

There is provided a multi-carrier communication method capable of preventing lowering of a throughput of another mobile device accompanying allocation of a sub-carrier for a new mobile station device. This multi-carrier communication method can acquire reception quality information for one of the sub-carriers already allocated in an MS (150$a$) from a BS (100$a$) and for one of the sub-carriers which can be allocated in the MS (150$a$) from the BS (100$b$). According to the reception quality information, a release sub-carrier is selected from the sub-carriers already allocated and a new-allocation sub-carrier is selected from the sub-carriers which can be allocated. The new-allocation sub-carrier has a frequency different from the already-allocated sub-carriers excluding the release sub-carrier. The BS (100$a$) is instructed to release the selected release sub-carrier and the BS (100$b$) is instructed to allocate the selected new-allocation sub-carrier in the MS (150$a$).

11 Claims, 14 Drawing Sheets

U.S. PATENT DOCUMENTS

| | | |
|---|---|---|
| 2002/0191535 A1 | 12/2002 | Sugiyama |
| 2004/0100940 A1 | 5/2004 | Kuure |
| 2005/0078761 A1 | 4/2005 | Hottinen |
| 2005/0085236 A1 | 4/2005 | Gerlach |
| 2006/0013182 A1 | 1/2006 | Balasubramanian |

FOREIGN PATENT DOCUMENTS

| | | |
|---|---|---|
| JP | 11-113049 | 4/1999 |
| JP | 11-178036 | 7/1999 |
| JP | 2000-134667 | 5/2000 |
| JP | 2005-80286 | 3/2005 |
| WO | 99/09774 | 2/1999 |

OTHER PUBLICATIONS

Russian Office Action dated Oct. 16, 2009, with English translation thereof.

* cited by examiner

| SUBCARRIER # | $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|---|
| Qa[dB] | 12 | 22 | 10 | 25 | 13 | 8 | 16 | 20 | 18 | 9 |
| Qb[dB] | 9 | 20 | 10 | 12 | 9 | 14 | 19 | 13 | 9 | 14 |
| D | −3 | −2 | 0 | −13 | −4 | 6 | 3 | −7 | −9 | 5 |
| ORDER | | 5th | 4th | | | 1st | 3rd | | | 2nd |

| SUBCARRIER # | $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|---|
| Qa[dB] | 12 | 22 | 10 | 25 | 13 | / | / | / | / | / |
| Qb[dB] | / | / | / | / | / | 14 | 19 | 13 | 9 | 16 |
| D | | | | | | | 9 | | | 4 |
| ORDER | 2nd | | 1st | | | | 1st | | | 2nd |

| SUBCARRIER # | GROUP A | | | | | GROUP B | | | | |
|---|---|---|---|---|---|---|---|---|---|---|
| | $f_1$ | $f_2$ | $f_3$ | $f_4$ | $f_5$ | $f_6$ | $f_7$ | $f_8$ | $f_9$ | $f_{10}$ |
| Qa[dB] | 12 | 22 | 10 | 25 | 13 | / | / | / | / | / |
| Qb[dB] | 8 | 5 | 12 | 10 | 17 | 14 | 19 | 13 | 9 | 16 |
| D | -4 | -17 | 2 | -15 | 4 | | 9 | | | 4 |

| SUBCARRIER # | GROUP A | | | GROUP A | | GROUP B | | | | |
|---|---|---|---|---|---|---|---|---|---|---|
| | $f_1$ | $f_2$ | $f_3$ | $f_4$ | $f_5$ | $f_6$ | $f_7$ | $f_8$ | $f_9$ | $f_{10}$ |
| Qa[dB] | 12 | 22 | E | 25 | 13 | / | / | / | / | / |
| Qb[dB] | 8 | 5 | 12 | 10 | 17 | 14 | E | 13 | 9 | 16 |
| D | -4 | -17 | 0 | -15 | 4 | | | | | 4 |

| SUBCARRIER # | $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|---|
| Qa[dB] | 12 | 22 | 10 | 25 | 13 | / | / | / | / | / |
| Qb[dB] | 8 | 5 | 12 | / | / | / | 19 | 13 | 9 | 16 |
| D | -4 | -17 | 2 | | | | 9 | | | 4 |

| SUBCARRIER # | $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|---|
| Qa[dB] | 12 | 22 | E | 25 | 13 | / | / | / | / | / |
| Qb[dB] | 8 | 5 | 12 | / | / | / | E | 13 | 9 | 16 |
| D | -4 | -17 | 0 | | | | | | | 4 |

MULTI-CARRIER COMMUNICATION DEVICE AND MULTI-CARRIER COMMUNICATION METHOD

This is a continuation application of application Ser. No. 11/909,404 filed Sep. 21, 2007 now U.S. Pat. No. 7,782,821, which is a national stage of PCT/JP2006/306172 filed Mar. 27, 2006, which is based on Japanese Application No. 2005-090814 filed Mar. 28, 2005, the entire contents of each which are incorporated by reference herein.

TECHNICAL FIELD

The present invention relates to a multicarrier communication apparatus and a multicarrier communication method. More particularly, the present invention relates to a multicarrier communication apparatus and a multicarrier communication method used in a cellular system in which a communication area is divided into a plurality of cells.

BACKGROUND ART

In a cellular system, when the number of mobile station apparatuses accommodated in a given base station apparatus (that is, mobile station apparatuses with which the base station apparatus has established radio link connections) increases and thereby traffic is concentrated (hereinafter, a base station apparatus in such a condition will be referred to as a "high traffic base station apparatus"), the high traffic base station apparatus may distribute, when accommodating a new mobile station apparatus, the load by forcibly causing any one of the accommodated mobile station apparatuses to perform handover (for example, Patent Document 1). However, as a result, the reception quality of the mobile station apparatus which is forced to perform handover may deteriorate. In such a case, the throughput of the mobile station apparatus forced to perform handover deteriorates.

By the way, a multicarrier scheme which is represented by an OFDM (Orthogonal Frequency Division Multiplexing) scheme and has strong resistance to interference and fading is becoming a focus of attention in recent years. The multicarrier scheme allows any one of a plurality of subcarriers to be allocated to a given mobile station apparatus and allows other allocated subcarriers to be allocated to other mobile station apparatuses. That is, in a cellular system based on a multicarrier scheme, a high traffic base station apparatus can deallocate subcarriers of relatively low reception quality out of subcarriers allocated to the already accommodated mobile station apparatus and allocate the deallocated subcarriers to a new mobile station apparatus. By this means, it is possible to reduce a decrease of throughput of the mobile station apparatus for which some subcarriers have been deallocated.

Patent Document 1: Japanese Patent Application Laid-Open No. HEI10-51836

DISCLOSURE OF INVENTION

Problems to be Solved by the Invention

According to a technique that can be adopted to realize load distribution by a base station apparatus in a cellular system based on a multicarrier scheme, for example, a peripheral base station apparatus allocates some subcarriers out of a plurality of subcarriers available to the peripheral base station apparatus to a mobile station apparatus whose subcarriers have been deallocated along with deallocation of subcarriers by a high traffic base station apparatus.

However, when the above described technique is adopted, the frequency of a subcarrier already allocated to a given mobile station apparatus from the high traffic base station apparatus may be the same as the frequency of a subcarrier to be newly allocated to the mobile station apparatus from the peripheral base station apparatus. In such a case, a signal transmitted from one base station apparatus may interfere with the signal transmitted from the other base station apparatus and cause the throughput of the mobile station apparatus to deteriorate.

It is therefore an object of the present invention to provide a multicarrier communication apparatus and a multicarrier communication method that make it possible to prevent a reduction of throughputs of other mobile station apparatuses along with allocation of subcarriers to a new mobile station apparatus.

Means for Solving the Problem

The multicarrier communication apparatus of the present invention adopts a configuration including: an acquisition section that acquires reception quality values of any one of a plurality of allocated subcarriers already allocated from a first base station apparatus to a mobile station apparatus and any one of a plurality of allocatable subcarriers which a second base station apparatus can newly allocate to the mobile station apparatus; a selection section that selects a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception quality values; and an instruction section that instructs the first base station apparatus to deallocate the selected first subcarrier and instructs the second base station apparatus to allocate the selected second subcarrier to the mobile station apparatus.

The base station apparatus of the present invention adopts a configuration including: an allocation section that allocates subcarriers to a mobile station apparatus; an acquisition section that acquires reception quality values of any one of a plurality of allocated subcarriers already allocated to the mobile station apparatus by the allocation section and any one of a plurality of allocatable subcarriers which another base station apparatus can newly allocate to the mobile station apparatus; a selection section that selects a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception quality values; a deallocation section that deallocates the selected first subcarrier; and an instruction section that instructs the another base station apparatus to allocate the selected second subcarrier to the mobile station apparatus.

The multicarrier communication of the present invention includes the steps of: acquiring reception quality values of any one of a plurality of allocated subcarriers already allocated from a first base station apparatus to a mobile station apparatus and any one of a plurality of allocatable subcarriers which a second base station apparatus can newly allocate to the mobile station apparatus; selecting a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception quality values; and instructing the first base station apparatus to deallocate the selected first subcarrier and instructing the second base station apparatus to allocate the selected second subcarrier to the mobile station apparatus.

Advantageous Effect of the Invention

According to the present invention, it is possible to prevent throughputs of other mobile station apparatuses from reducing along with allocation of subcarriers to a new mobile station apparatus.

BEST MODE FOR CARRYING OUT THE INVENTION

Embodiments of the present invention will be explained in detail below with reference to the attached drawings.

Embodiment 1

Figure 1:
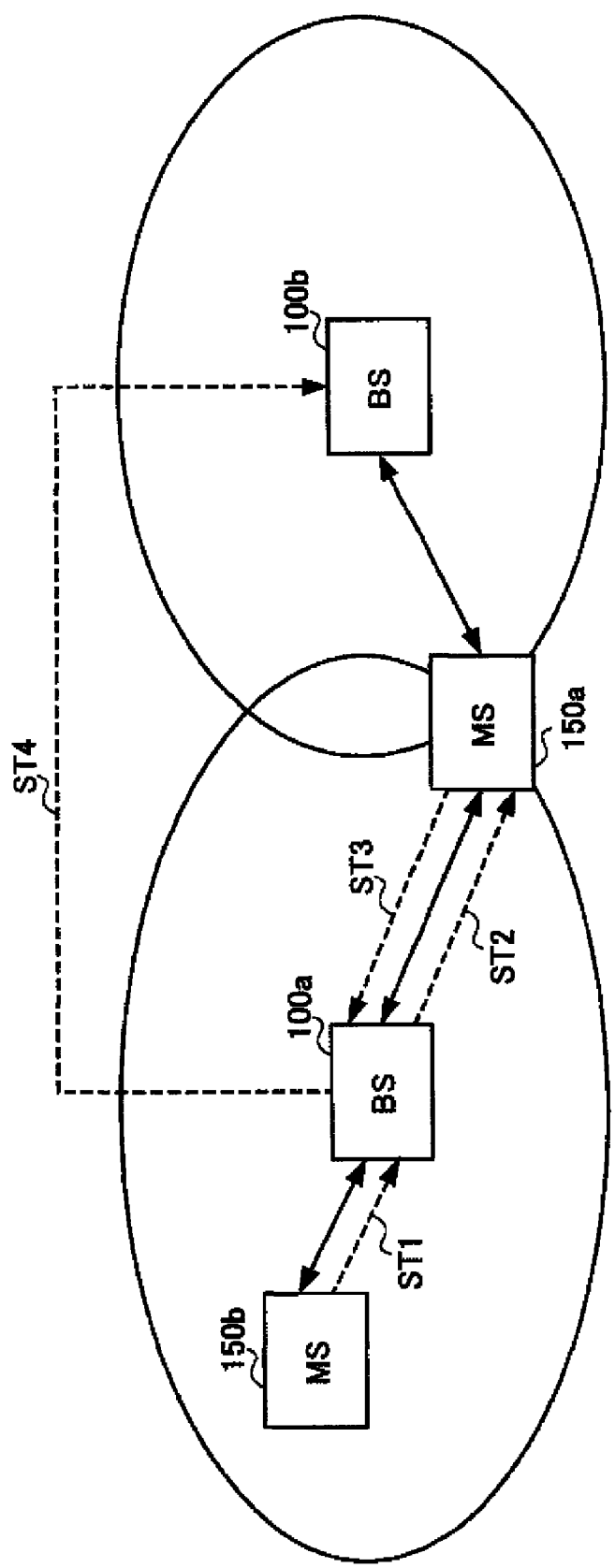
FIG. 1 is a block diagram showing the configuration of a cellular system according to Embodiment 1 of the present invention.

FIG. 1 shows the configuration of a cellular system according to Embodiment 1 of the present invention. The cellular system in FIG. 1 has base station apparatuses (BS) 100*a* and 100*b* arranged in two mutually neighboring cells.

This embodiment will explain a case as an example where MS150*b* located in a cell of BS100*a* starts a communication with BS100*a* while mobile station apparatus (MS) 150*a* located in the vicinity of a boundary between the two cells is communicating with BS100*a*.

The configurations of BS100*a* and MS150*a* will be explained below in order. Preferably, BS100*b* has the same configuration as BS100*a*. MS150*b* has the same configuration as MS150*a*.

Figure 2:
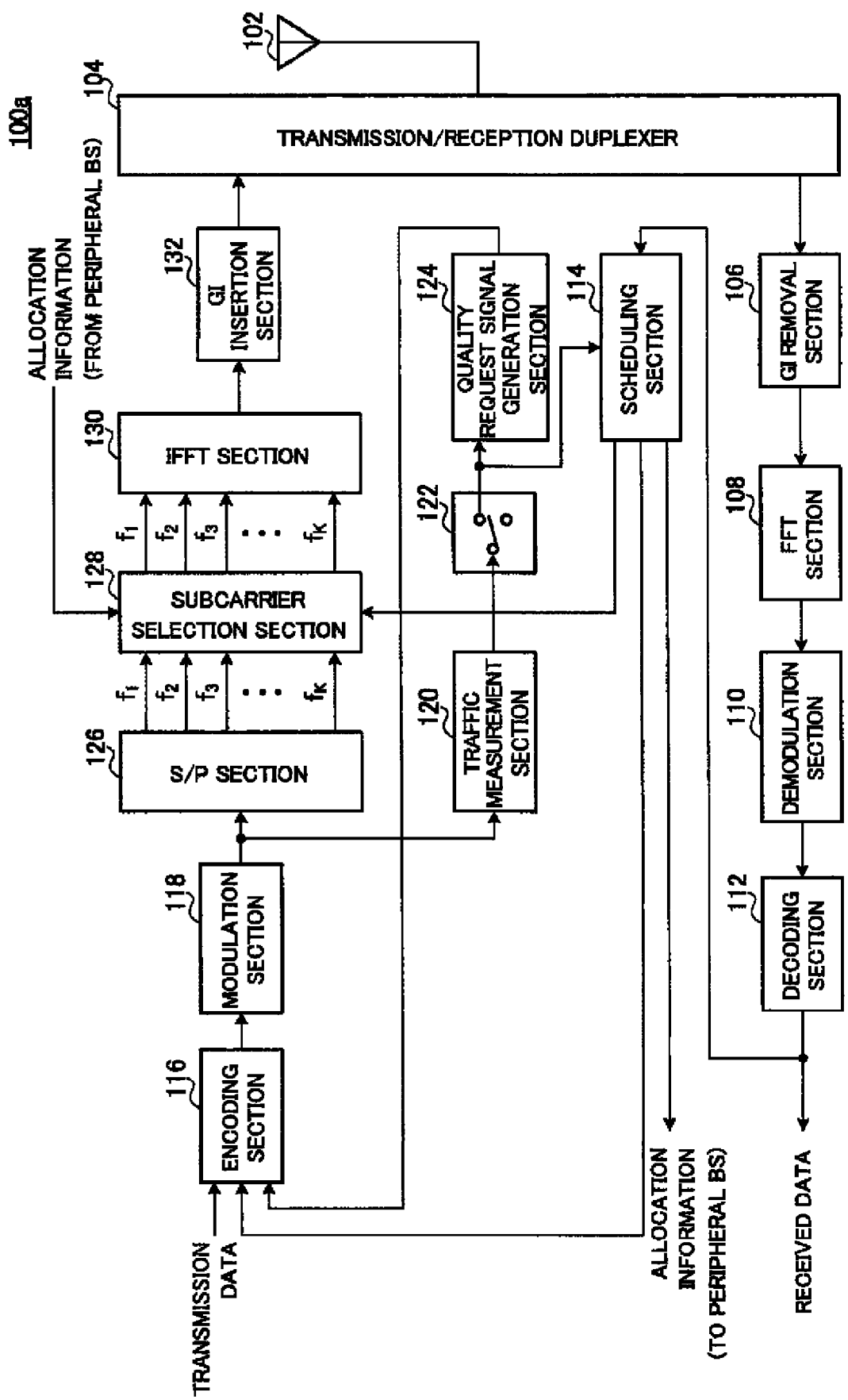
FIG. 2 is a block diagram showing the configuration of a base station apparatus according to Embodiment 1 of the present invention.

As shown in FIG. 2, BS100*a* has antenna 102, transmission/reception duplexer 104, GI (Guard Interval) removal section 106, FFT (Fast Fourier Transform) section 108, demodulation section 110, decoding section 112, scheduling section 114, encoding section 116, modulation section 118, traffic measuring section 120, switch section 122, quality request signal generation section 124, serial/parallel conversion (S/P) section 126, subcarrier selection section 128, IFFT (Inverse Fast Fourier Transform) section 130 and GI insertion section 132.

Transmission/reception duplexer 104 receives a radio signal transmitted from MS150*a* or MS150*b* through antenna 102. Transmission/reception duplexer 104 then obtains a baseband signal by applying predetermined radio reception processing (such as down-conversion and A/D conversion, for example) to the received radio signal.

Furthermore, transmission/reception duplexer 104 generates a radio signal by applying predetermined radio transmission processing (such as D/A conversion and up-conversion, for example) to the signal where GI has been inserted by GI insertion section 132. Transmission/reception duplexer 104 transmits the generated radio signal to MS150*a* or MS150*b* through antenna 102.

GI removal section 106 removes GI inserted at a predetermined location of the baseband signal obtained by transmission/reception duplexer 104. FFT section 108 applies FFT processing to the signal from which GI has been removed by GI removal section 106. Demodulation section 110 demodulates the signal subjected to FFT processing. Decoding section 112 decodes the signal demodulated by demodulation section 110. The decoded signal is outputted as received data. Alternatively, when a control signal (described later) generated by MS150*a* or MS 150*b* is included in the decoded signal, the control signal is outputted to scheduling section 114.

When concentration of traffic is reported as a result of traffic measurement by traffic measuring section 120, scheduling section 114 generates deallocation information and allocation information according to the control signal decoded by decoding section 112, reports the deallocation information to subcarrier selection section 128 of BS100a and also reports the allocation information to peripheral BS. In addition, the deallocation information and the allocation information are also outputted to encoding section 116.

Here, the deallocation information is a signal to instruct deallocation of subcarriers allocated to a given MS and indicates the subcarrier to be deallocated (hereinafter, referred to as "subcarrier to be deallocated"). Furthermore, the allocation information is a signal to instruct BS100b to newly allocate subcarriers along with the deallocation of the subcarriers and indicates the subcarrier to be newly allocated (hereinafter, referred to as "subcarrier to be newly allocated"). BS100b which receives the allocation information allocates a signal directed to MS150a to the subcarrier to be newly allocated, applies IFFT processing to the signal after the allocation, generates a radio signal from the signal after the IFFT processing and transmits this radio signal to MS150a. Details of the generation of deallocation information and the allocation information will be When transmission data directed to MS150a or MS150b is inputted, encoding section 116 encodes the transmission data, and, when a quality request signal is inputted from quality request signal generation section 124, encoding section 116 encodes the quality request signal, and, when the allocation information and the deallocation information are inputted from scheduling section 114, encoding section 116 encodes the allocation information and the deallocation information.

Modulation section 118 modulates the signal obtained through the encoding processing by encoding section 116. S/P section 126 converts the signal modulated by modulation section 118 from serial to parallel.

Traffic measuring section 120 measures the traffic of the base station apparatus 100a using the signal modulated by modulation section 118. When the measured traffic is equal to or higher than a predetermined level, the output of traffic measuring section 120 is connected to the input of quality request signal generation section 124 by switch section 122. By this means, the concentration of traffic is reported to scheduling section 114 and quality request signal generation section 124.

When the concentration of traffic is reported as a result of traffic measurement by traffic measuring section 120, quality request signal generation section 124 generates a quality request signal which requests a report of the reception quality value for each subcarrier from MS150a and outputs the quality request signal to encoding section 116.

Subcarrier selection section 128 selects any one of K subcarriers (K is an integer equal to or greater than 2) and allocates the selected subcarriers to the signal converted from serial to parallel by S/P section 126.

More specifically, when, for example, the deallocation information is reported when all subcarriers $f_1$ to $f_K$ are allocated to the signal directed to MS 150a, subcarrier selection section 128 deallocates subcarriers to be deallocated indicated in the deallocation information out of all subcarriers $f_1$ to $f_K$. Subcarrier selection section 128 then allocates subcarriers other than the subcarriers to be deallocated to the signal directed to MS150a. Moreover, subcarrier selection section 128 allocates all the subcarriers to be deallocated to the signal directed to MS150b. When all the subcarriers to be deallocated are allocated to new MS, that is, MS150b, the frequency utilization efficiency can be maintained. By the way, only any one of the subcarriers to be deallocated may be allocated to the signal directed to MS150b.

Furthermore, the allocation information may also be reported to subcarrier selection section 128 from peripheral BS (for example, BS100b). This allocation information is used to reduce the load of peripheral BS when BS100a newly allocates a subcarrier to be newly allocated which replaces the deallocated subcarrier that is deallocated from allocation to MS accommodated in peripheral BS.

IFFT section 130 applies IFFT processing to the signal to which subcarriers $f_1$ to $f_K$ have been allocated. GI insertion section 132 inserts GI at a predetermined location of the signal subjected to IFFT processing by IFFT section 130.

Figure 3:
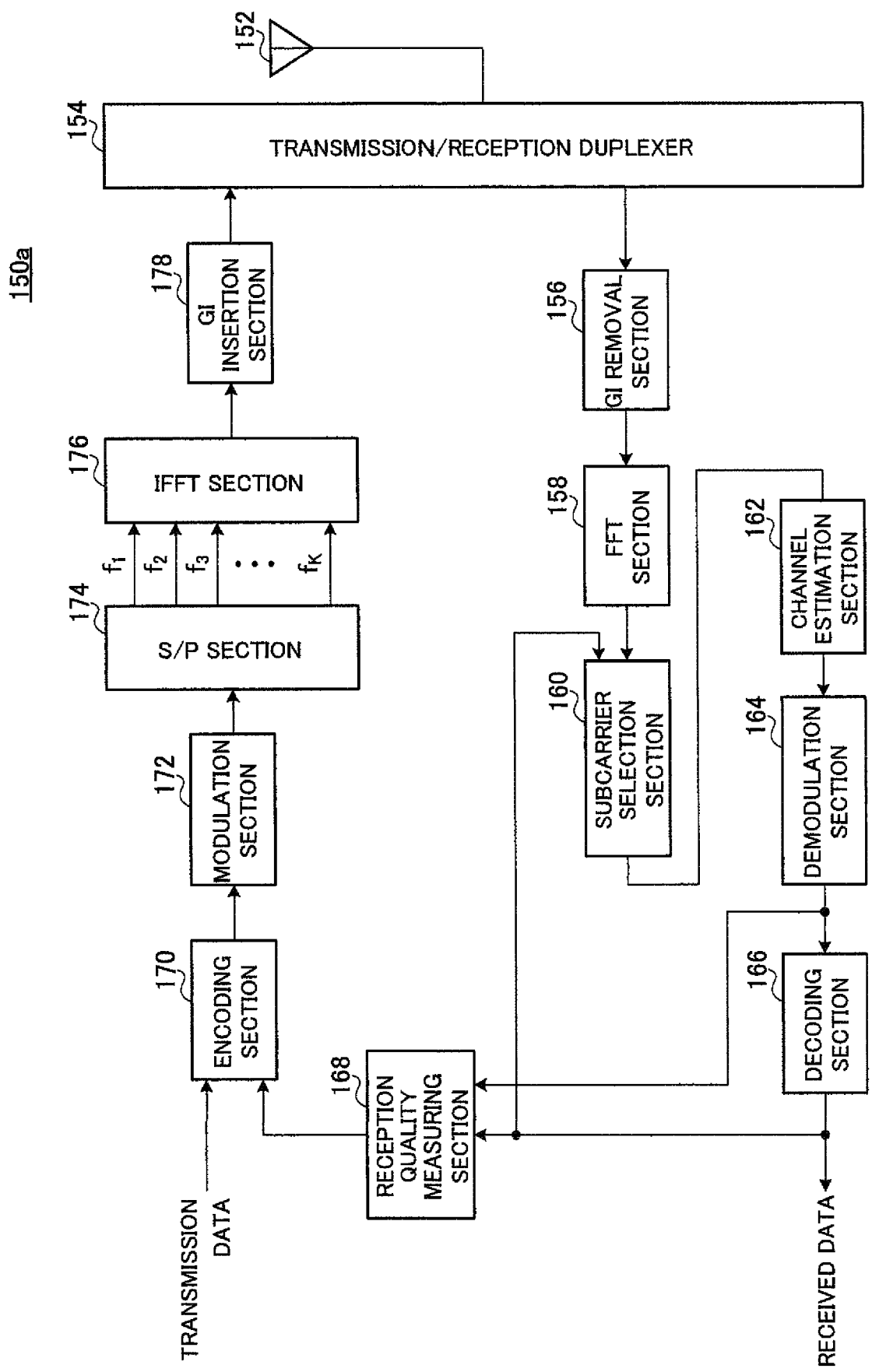
FIG. 3 is a block diagram showing the configuration of a mobile station apparatus according to Embodiment 1 of the present invention.

As shown in FIG. 3, MS150a has antenna 152, transmission/reception duplexer 154, GI removal section 156, FFT section 158, subcarrier selection section 160, channel estimation section 162, demodulation section 164, decoding section 166, reception quality measuring section 168, encoding section 170, modulation section 172, S/P section 174, IFFT section 176 and GI insertion section 178.

Transmission/reception duplexer 154 receives a radio signal transmitted from BS100a or BS100b through antenna 152. Transmission/reception duplexer 154 then obtains a baseband signal by applying predetermined radio reception processing to the received radio signal.

Furthermore, transmission/reception duplexer 154 generates a radio signal by applying predetermined radio transmission processing to the signal where GI has been inserted by GI insertion section 178. Transmission/reception duplexer 154 transmits the generated radio signal to BS100a or BS100b through antenna 152.

GI removal section 156 removes GI inserted at a predetermined location of the baseband signal obtained by transmission/reception duplexer 154. FFT section 158 applies FFT processing to the signal from which GI has been removed by GI removal section 156.

Subcarrier selection section 160 selects subcarriers allocated to MS150a out of subcarriers $f_1$ to $f_K$ according to the deallocation information and the allocation information reported from decoding section 166. Here, the selected subcarriers include the subcarriers allocated from BS100a and the subcarriers allocated from BS100b. Subcarrier selection section 160 outputs the signal transmitted with the subcarriers allocated by BS100a and the signal transmitted with the subcarriers allocated by BS100b to channel estimation section 162. In the following explanations, the signal transmitted with the subcarriers allocated by BS100a will be called a "BS100a signal" and the signal transmitted with the subcarriers allocated by BS100b will be called a "BS100b signal."

Channel estimation section 162 performs channel estimation using the above described two signals inputted from subcarrier selection section 160, that is, BS100a signal and BS100b signal and obtains a channel estimation result corresponding to the channel used for a communication with BS100a and a channel estimation result corresponding to the channel used for a communication with BS100b. The obtained channel estimation results are outputted to demodulation section 164 together with BS100a signal and BS100b signal.

Demodulation section 164 performs channel compensation using the channel estimation value corresponding to the channel used for the communication with BS100a and demodulates BS100a signal. Furthermore, demodulation section 164 performs channel compensation using the channel estimation value corresponding to the channel used for the communication with BS100b and demodulates BS100b signal.

Decoding section 166 decodes the signal demodulated by demodulation section 164. The decoded signal is outputted as received data. Furthermore, when the deallocation information and the allocation information are included in the decoded signal, the deallocation information and the allocation information are outputted to subcarrier selection section 160. In addition, when a quality request signal is included in the decoded signal, the quality request signal is outputted to reception quality measuring section 168.

Reception quality measuring section 168 measures the reception quality of the signal demodulated by demodulation section 164 according to the quality request signal inputted from decoding section 166 and generates reception quality information indicating the measured reception quality. According to this embodiment, the reception quality of each subcarrier on the channel used for the communication with BS100a and the reception quality of each subcarrier on the channel used for the communication with and BS100b are measured. Then, reception quality information that indicates a measured value indicating the measured reception quality, or a numerical value directly or indirectly derived from the measured reception quality, is generated.

In this embodiment and the following embodiments, the measured value indicating the measured reception quality and the numerical value directly or indirectly derived from the measured reception quality are generically called "reception quality values."

Furthermore, examples of the measured values of reception quality include an SNR (Signal to Noise Ratio), SIR (Signal to Interference Ratio), SINR (Signal to Interference and Noise Ratio), CIR (Carrier to Interference Ratio), CNR (Carrier to Noise Ratio), CINR (Carrier to Interference and Noise Ratio), RSSI (Received Signal Strength Indicator), reception power value, interference power value, error rate, transmission rate and throughput. Furthermore, examples of numerical values directly or indirectly derived from the measured reception quality include an MCS (Modulation and Coding Scheme) level.

When transmission data is inputted, encoding section 170 encodes the transmission data. Furthermore, when the reception quality information generated by reception quality measuring section 168 is inputted, encoding section 170 encodes the reception quality information. Modulation section 172 modulates the signal obtained through the encoding by encoding section 170. S/P section 174 converts the signal modulated by modulation section 172 from serial to parallel. IFFT section 176 applies IFFT processing to the signal converted from serial to parallel by S/P section 174. GI insertion section 178 inserts a GI at a predetermined location of the signal subjected to IFFT processing by IFFT section 176.

In the cellular system having BS100a and MS150a in the above configurations together with BS100b and MS150b, as shown in FIG. 1, for example, to start a communication with BS100a, MS150b transmits desired throughput information indicating a desired throughput to BS100a as a control signal (step ST1). When receiving the desired throughput information from MS150b, BS100a requests a report of the reception quality from MS150a which is already in communication (step ST2).

MS150a generates reception quality information according to the request for a reception quality report and transmits the reception quality report to BS100a (step ST3). BS100a which receives the information of the reception quality determines subcarriers to be allocated to MS150b so as to satisfy the desired throughput shown in the desired throughput information received from MS150b. Along with this, BS100a determines subcarriers to he deallocated from MS150a (subcarriers to be deallocated) and subcarriers to be newly allocated from BS100b to MS150a (subcarriers to be newly allocated). BS100a then generates deallocation information indicating the subcarriers to be deallocated and allocation information indicating the subcarriers to be newly allocated and transmits the generated deallocation information and the generated allocation information to MS150a. Concurrently with this, BS100a transmits the allocation information to BS100b (step ST4).

Figure 4:
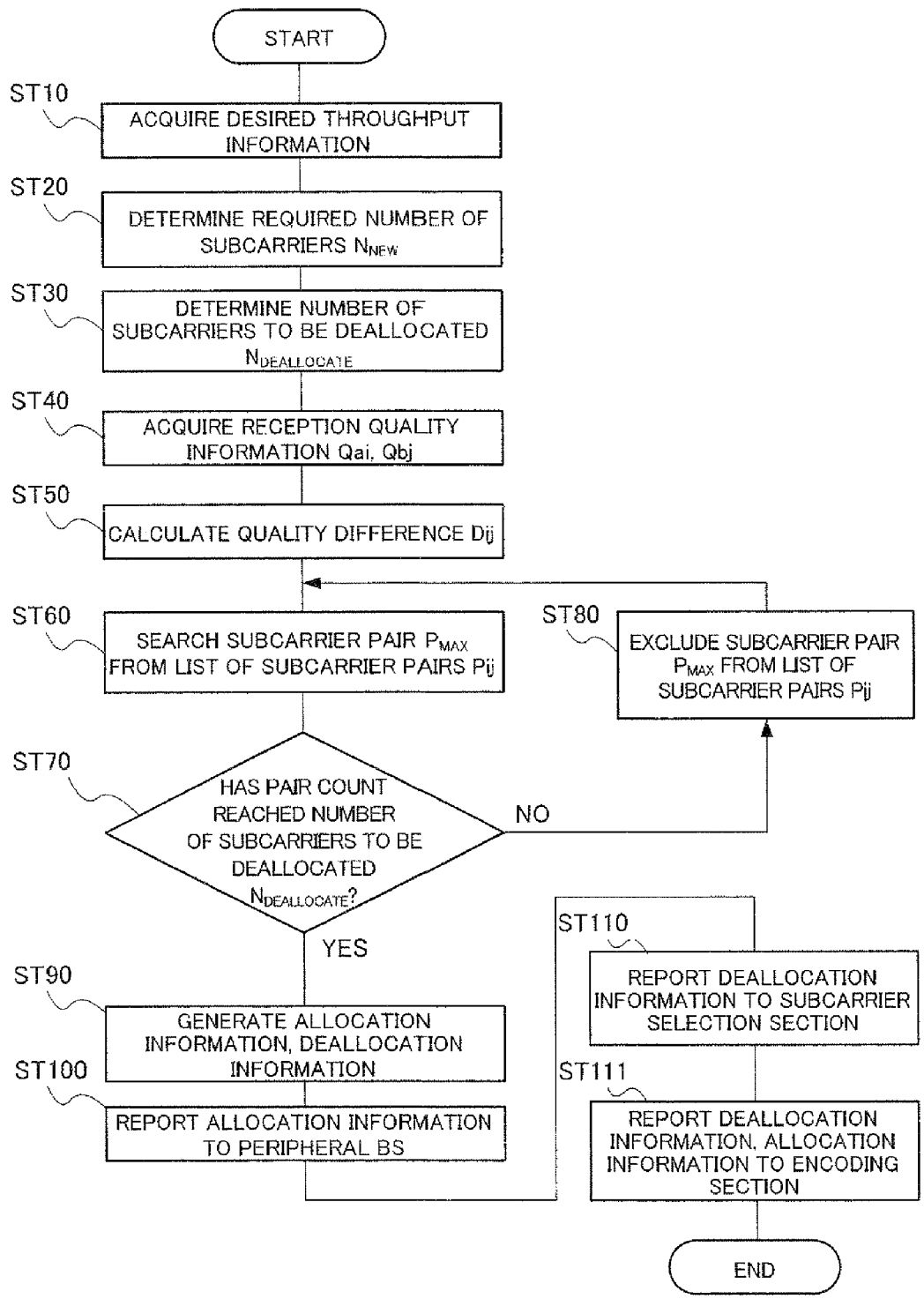
FIG. 4 is a flowchart illustrating operation steps of a scheduling section according to Embodiment I of the present invention.

To realize the above described operation in the cellular system, scheduling section 114 of BS100a operates according to the steps as follows. FIG. 4 is a flowchart illustrating an example of the operation steps at scheduling section 114.

First, scheduling section 114 acquires desired throughput information transmitted from MS150b (step ST10). Based on the desired throughput indicated in the desired throughput information, that is, the throughput required by MS150b, scheduling section 114 determines the number of required subcarriers $N_{NEW}$, that is, the number of subcarriers to be allocated to MS150b (step ST20). Next, scheduling section 114 determines the number of subcarriers to be deallocated $N_{DEALLOCATE}$ (step ST30). In this embodiment, the number of subcarriers to be deallocated $N_{DEALLOCATE}$ is equal to the number of required subcarriers $N_{NEW}$. However, scheduling section 114 may also determine the number of subcarriers to be deallocated $N_{DEALLOCATE}$ fewer than the number of required subcarriers $N_{NEW}$.

Furthermore, scheduling section 114 acquires reception quality information Qai and Qbj generated by MS150a (step ST40). Reception quality information Qai indicates the measured value of the reception quality of subcarrier $f_i$ (i is an arbitrary integer from 1 to K) which MS150a receives from BS100a or a numerical value derived from the measured value, Reception quality information Qbj indicates the measured value of the reception quality of subcarrier $f_j$ (j is an arbitrary integer from 1 to K) which MS150a receives from BS100b or a numerical value derived from the measured value.

Scheduling section 114 then calculates quality difference Dij which corresponds to subcarrier pair Pij comprised of subcarriers $f_i$ and $f_j$ (step ST50). Quality difference Dij can indicate how good the reception quality of subcarrier $f_j$ is, compared to the reception quality of subcarrier $f_i$.

Furthermore, in this embodiment, quality difference Dij is obtained by subtracting the value of reception quality information Qai from the value of reception quality information Qbj. In this way, when, for example, reception quality information Qai and Qbj express that the reception condition is better when the values indicated by reception quality information Qai and Qbj become greater, quality difference Dij can indicate how good the reception quality of subcarrier $f_j$ is, compared to the reception quality of subcarrier $f_i$.

When reception quality information Qai and Qbj express that the reception condition is worse when the values indicated by reception quality information Qai and Qbj become greater, quality difference Dij may also be obtained by subtracting the value of reception quality information Qbj from the value of reception quality information Qai.

Furthermore, in this embodiment, quality difference Dij is calculated from subcarrier pair Pij comprised of subcarriers $f_i$ and $f_j$ having the same frequency. This calculation method is preferably used when the frequency band of all subcarriers already allocated by BS100a to MS150a (hereinafter, referred to as an "allocated band") is the same frequency band (hereinafter, referred to as an "allocatable band") as all subcarriers that can be newly allocated by BS100a to MS150a (hereinafter, referred to as "allocatable subcarriers").

In step ST60, scheduling section 114 searches subcarrier pair $P_{MAX}$ having largest quality difference Dij in the list of all subcarrier pairs Pij. In this way, subcarrier pair $P_{MAX}$ which maximizes quality difference Dij is searched, so that it is possible to improve the effect of compulsory handover in subcarrier units.

On the other hand, when reception quality information Qai and Qbj express that the reception condition is worse when the values indicated by reception quality information Qai and Qbj become greater, subcarrier pair $M_{MIN}$ which has smallest quality difference Dij may also be searched.

Moreover, in step ST60, a pair count is updated by adding 1 to the pair count when subcarrier pair $P_{MAX}$ is searched. The initial value of the pair count is 0.

The updated pair count is then compared with the number of subcarriers to be deallocated $N_{DEALLOCATE}$ (step ST70). When the pair count has not yet reached the number of subcarriers to be deallocated $N_{DEALLOCATE}$ (ST70: NO), subcarrier pair $P_{MAX}$ is excluded from the list of subcarrier pairs Pij (step ST80) before the flow returns to the processing in step ST60.

Furthermore, when the updated pair count reaches the number of subcarriers to be deallocated $N_{DEALLOCATE}$ (ST70: YES), the information indicating all subcarrier pairs Pij searched as subcarrier pair $P_{MAX}$ is generated as the allocation information and the deallocation information (step ST90). Scheduling section 114 then reports the generated allocation information to peripheral BS, that is, BS100b (step ST100). By this means, scheduling section 114 instructs BS100b to newly allocate subcarrier $f_j$ included in subcarrier pair Pij that is searched as subcarrier pair $P_{MAX}$ to MS150a.

In addition, scheduling section 114 reports the generated deallocation information to subcarrier selection section 128 (step ST110). In this way, scheduling section 114 instructs subcarrier selection section 128 of BS100a to deallocate subcarrier $f_i$ included in subcarrier pair Pij which is searched as subcarrier pair $P_{MAX}$ from MS150a.

Furthermore, scheduling section 114 reports the generated deallocation information and the generated allocation information to encoding section 116 (step ST111). The deallocation information and the allocation information are transmitted to MS150a, so that MS150a can know which subcarrier is used for transmissions from BS100a and BS100b.

Figures 5A, 5B:
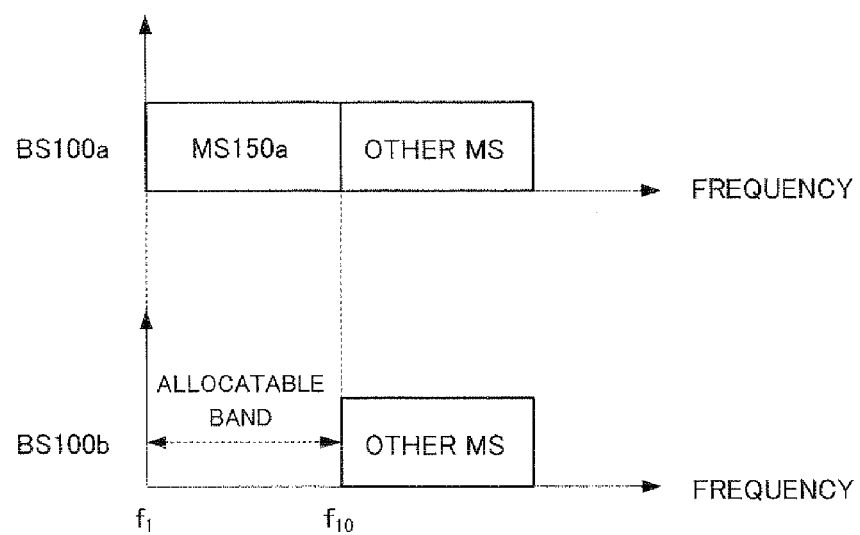
FIG. 5A illustrates a specific example of the operation of the scheduling section according to Embodiment 1 of the present invention.
FIG. 5B illustrates a specific example of the operation of the scheduling section according to Embodiment 1 of the present invention.

Next, a specific example of the operation of scheduling section 114 according to the above described operation steps will be explained using FIGS. 5A and 5B. Here, as shown in FIG. 5A, a case will be explained as an example where the allocated band of BS100a is the same as the allocatable band of BS100b, and 10 subcarriers $f_1$ to $f_{10}$ are included in each band.

Scheduling section 114 acquires reception quality information Qai and Qbj of subcarriers $f_1$ to $f_{10}$ and calculates quality difference Dij of each subcarrier pair Pij. As a result, quality difference D66 of subcarrier pair P66 which corresponds to subcarrier $f_6$ is the largest among all subcarrier pairs Pij, and is 6. That is, subcarrier pair P66 is selected as first subcarrier pair $P_{MAX}$. Furthermore, among all subcarrier pairs Pij except subcarrier pair P66, subcarrier pair P1010 has the largest quality difference Dij. That is, subcarrier pair P1010 is selected as second subcarrier pair $P_{MAX}$. When the number of subcarriers to be deallocated $N_{DEALLOCATE}$ is set to, for example, 5, subcarrier pairs P77, P33 and P22 are selected in order following two subcarrier pairs P66 and P1010.

Consequently, according to this embodiment, based on reception quality information Qai and Qbj of subcarriers $f_i$ and $f_j$, subcarriers to be deallocated are selected out of a plurality of allocated subcarriers, and subcarriers to be newly allocated having different frequencies from those of all the plurality of allocated subcarriers are selected. The deallocation of the selected subcarriers to be deallocated is instructed to subcarrier selection section 128 of BS100a, and the allocation of the selected subcarriers to be newly allocated to MS150a is instructed to BS100b. It is therefore possible to prevent the frequencies of the allocated subcarriers already allocated from high traffic BS100a to MS150a from coinciding with the frequencies of the subcarriers to be newly allocated that is newly allocated from BS100b to MS150a. Therefore, it is possible to prevent throughput of MS150a from reducing.

Embodiment 2

Embodiment 2 of the present invention will be explained below. The configurations of the cellular system, BS and MS according to this embodiment are the same as explained in Embodiment 1, and therefore explanations of the respective configurations will be omitted. This embodiment differs from Embodiment 1 only in the operation steps at scheduling section 114 executed to realize the operation (steps ST1 to 4) of the cellular system explained in Embodiment 1.

Figure 6:
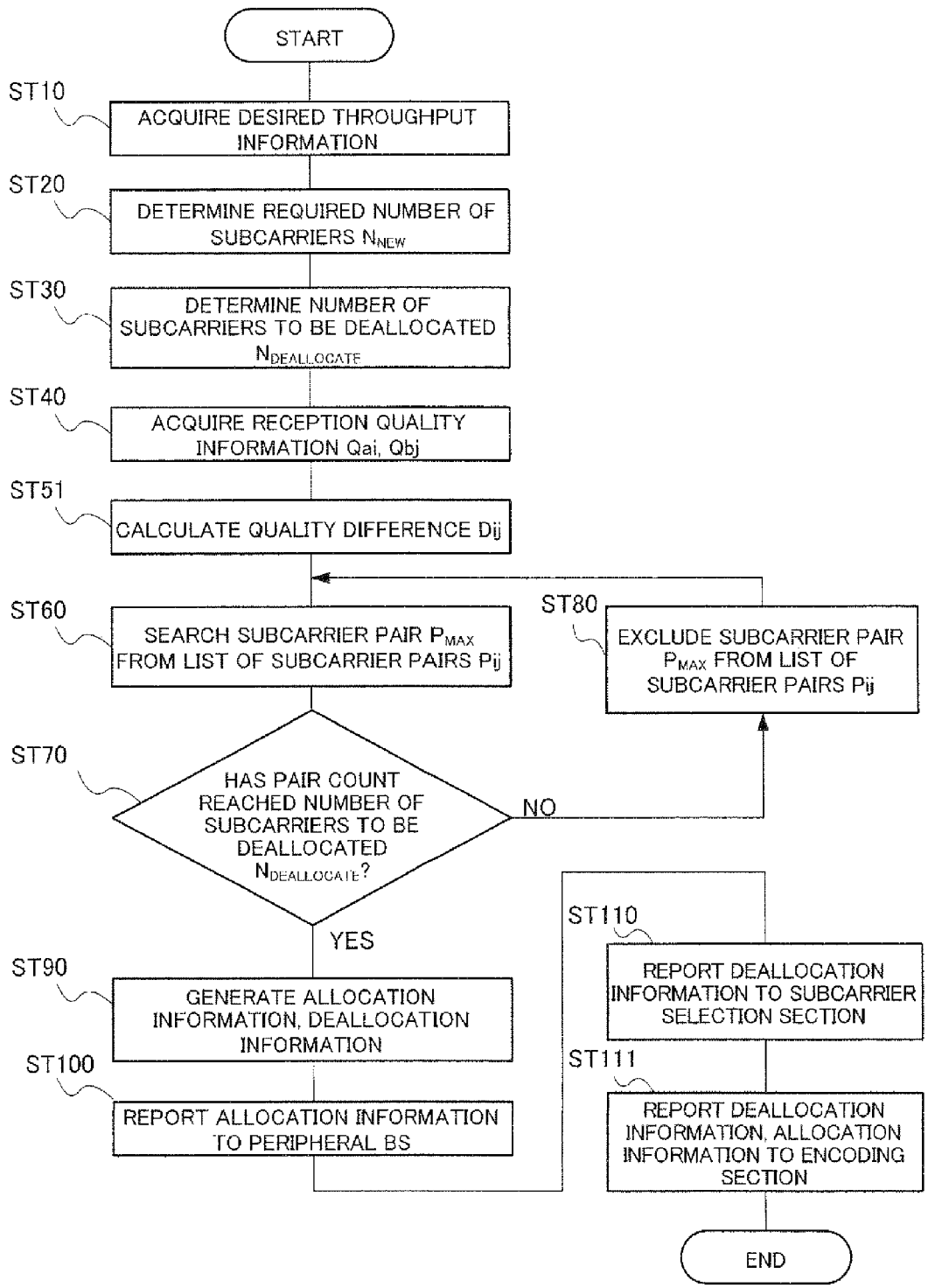
FIG. 6 is a flowchart illustrating operation steps of a scheduling section according to Embodiment 2 of the present invention.

To realize the above described operation in the cellular system, scheduling section 114 of BS100a operates according to the steps which will be explained below. FIG. 6 is a flowchart illustrating an example of the operation steps of scheduling section 114.

First, steps ST10 to 40 explained in Embodiment 1 are executed.

In step ST51 following step ST40, quality difference Dij is calculated which corresponds to subcarrier pair Pij comprised of subcarriers $f_i$ and $f_j$. Quality difference Dij can express how good the reception quality of subcarrier $f_j$ is, compared to the reception quality of subcarrier $f_i$.

Furthermore, in this embodiment, quality difference Dij is obtained by subtracting the value of reception quality information Qai from the value of reception quality information Qbj. When, for example, reception quality information Qai and Qbj express that the reception condition is better when the values indicated by reception quality information Qai and Qbj become greater, quality difference Dij can indicate how good the reception quality of subcarrier $f_j$ is, compared to the reception quality of subcarrier $f_i$.

On the other hand, when reception quality information Qai and Qbj express that the reception condition is worse when the values indicated by reception quality information Qai and Qbj become greater, quality difference Dij may also be obtained by subtracting the value of reception quality information Qbj from the value of reception quality information Qai Furthermore, in this embodiment, quality difference Dij is calculated from subcarrier pair Pij comprised of subcarriers $f_i$ and $f_j$ having different frequencies. This calculation method is preferably used when the frequency of subcarrier $f_j$ included in an allocatable band is different from any subcarrier $f_i$ included in an allocated band, in other words, when the allocated band does not overlap with the allocatable band at all.

After executing step ST51, scheduling section 111 executes steps ST60 to 111 explained in Embodiment 1.

Figures 7A, 7B:
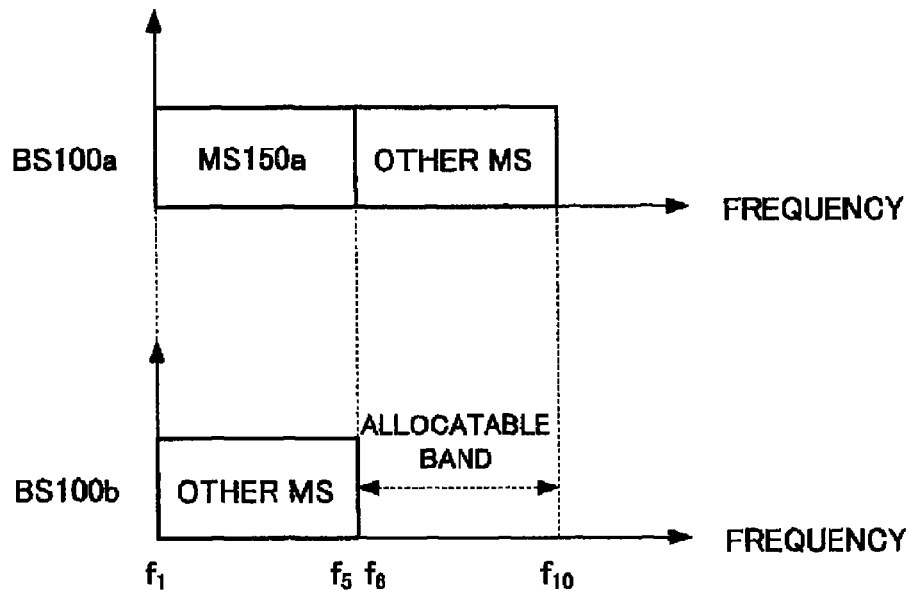
FIG. 7A illustrates a specific example of the operation of the scheduling section according to Embodiment 2 of the present invention.
FIG. 7B illustrates a specific example of the operation of the scheduling section according to Embodiment 2 of the present invention.

Next, a specific example of the operation of scheduling section 114 according to the above described operation steps will be explained using FIGS. 7A and 7B. As shown in FIG. 7A, a case will be explained as an example where the allocated band of BS100a does not overlap with the allocatable band of BS100b at all and subcarriers $f_1$ to $f_5$ are included in the allocated band and subcarriers $f_6$ to $f_{10}$ are included in the allocatable band.

Scheduling section 114 acquires reception quality information Qai of subcarriers $f_1$ to $f_5$ and also acquires reception quality information Qbj of subcarriers $f_6$ to $f_{10}$. As a result, quality difference D37 obtained by subtracting the value of reception quality information Qa3 which corresponds to subcarrier $f_3$ from the value of reception quality information Qb7 which corresponds to subcarrier $f_7$ is the largest among all subcarrier pairs Pij and is 9. That is, subcarrier pair P37 is selected as first subcarrier pair $P_{MAX}$. Furthermore, among all subcarrier pairs Pij except subcarrier pair P37, subcarrier pair P110 is the largest quality difference Dij. That is, subcarrier pair P110 is selected as second subcarrier pair $P_{MAX}$.

In this way, according to this embodiment, even when the allocated band does not overlap with the allocatable band, the effect of compulsory handover in subcarrier units can be improved.

Embodiment 3

Embodiment 3 of the present invention will be explained below. The configurations of the cellular system, BS and MS according to this embodiment are the same as explained in Embodiment 1, and therefore explanations of the respective configurations will be omitted. This embodiment differs from Embodiment 1 only in the operation steps of scheduling section 114 executed to realize the operation (steps STI to 4) of the cellular system explained in Embodiment 1.

Figure 8:
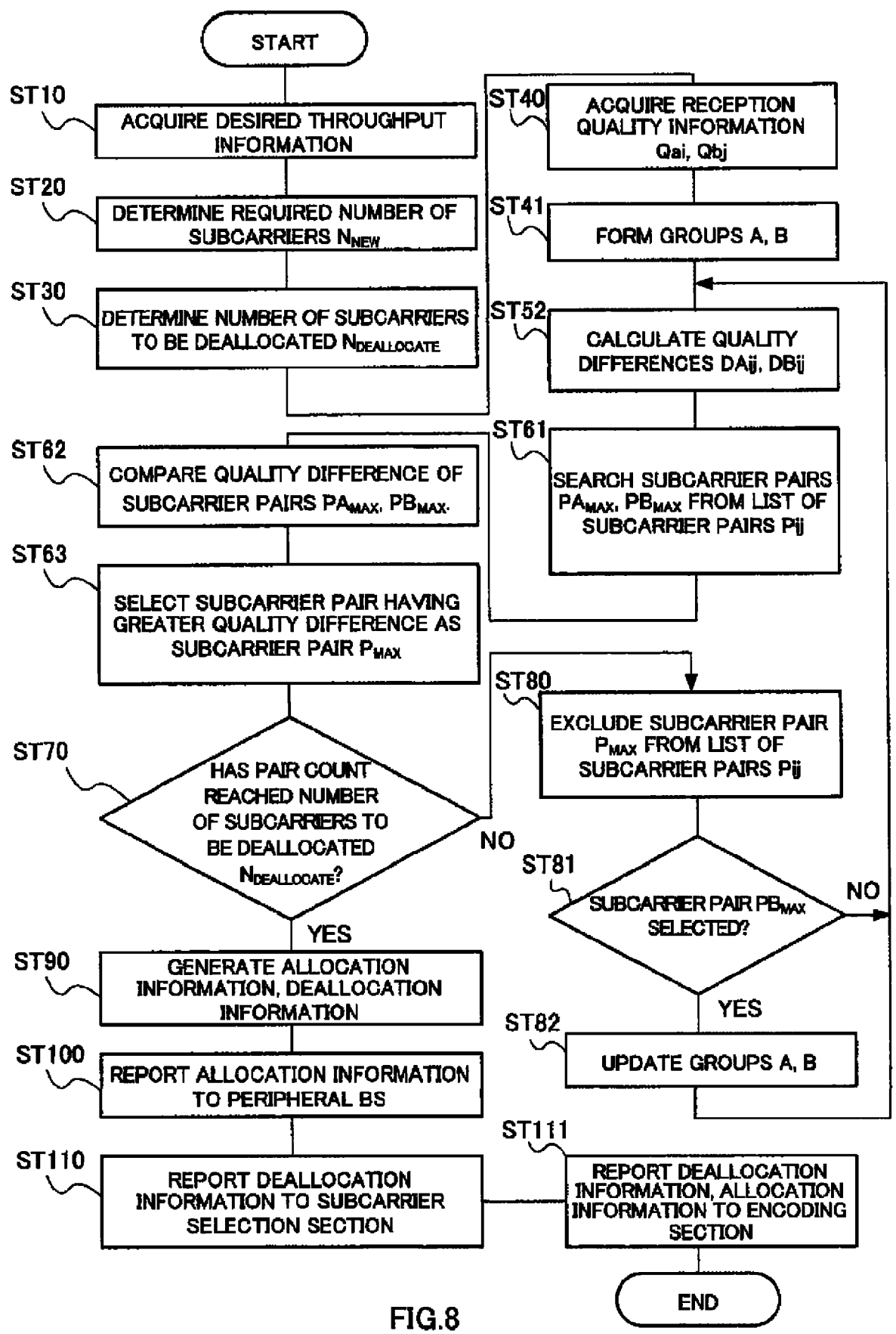
FIG. 8 is a flowchart illustrating operation steps of a scheduling section according to Embodiment 3 of the present invention.

Scheduling section 114 of BS100a operates according to the steps which will be explained below to realize the above described operation in the cellular system. FIG. 8 is a flowchart illustrating an example of the operation steps of scheduling section 114.

First, scheduling section 114 executes steps ST10 to 40 explained in Embodiment 1.

In step ST41 following step ST40, two groups A and B are formed. Group A is formed with the allocatable subcarriers having the same frequencies as any one of allocated subcarriers included in an allocated band. Group B is formed with the allocatable subcarriers having different frequencies from any allocated subcarriers included in the allocated band.

Scheduling section 114 calculates quality differences DAij and DBij which correspond to subcarrier pair Pij comprised of subcarriers $f_i$ and $f_j$ (step ST52). Quality difference DAij is calculated from subcarrier pair Pij comprised of subcarriers $f_i$ and $f_j$ having the same frequencies. In this case, allocatable subcarriers belong to group A. Quality difference DBij is calculated from subcarrier pair Pij comprised of subcarriers $f_i$ and $f_j$ having different frequencies. In this case, allocatable subcarriers belong to group B.

Both quality differences DAij and Dbij can express how good the reception quality of subcarrier $f_j$ is, compared to the reception quality of subcarrier $f_i$.

Furthermore, in this embodiment, both quality differences DAij and DBij are obtained by subtracting the value of reception quality information Qai from the value of reception quality information Qbj. By this means, when, for example, reception quality information Qai and Qbj express that the reception condition is better when the values indicated by reception quality information Qai and Qbj become greater, quality differences Daij and Dbij can express how good the reception quality of subcarrier $f_j$ is, compared to the reception quality of subcarrier $f_i$.

When reception quality information Qai and Qbj express that the reception condition is worse when the values indicated by reception quality information Qai and Qbj become greater, quality differences DAij and Dbij may also be obtained by subtracting the value of reception quality information Qbj from the value of reception quality information Qai.

In step ST61, scheduling section 114 searches subcarrier pair $PA_{MAX}$ having largest quality difference DAij in the list of all subcarrier pairs Pij and subcarrier pair $PB_{MAX}$ having largest quality difference DBij in the list of all subcarrier pairs Pij.

When reception quality information Qai and Qbj express that the reception condition is worse when the values indicated by reception quality information Qai and Qbj become greater, scheduling section 114 may also search subcarrier pairs $MA_{MIN}$ and $MB_{MIN}$ having smallest quality differences DAij and DBij.

In step ST62, the quality difference of subcarrier pair $PA_{MAX}$ and the quality difference of subcarrier $PB_{MAX}$ are compared. Subcarrier pair $PA_{MAX}$ or $PB_{MAX}$, whichever has the greater quality difference is selected as subcarrier pair $P_{MAX}$ (step ST63).

Moreover, in step ST63, when subcarrier pair $P_{MAX}$ is selected, a pair count is updated by adding 1 to the pair count. The initial value of the pair count is 0.

After executing step ST63, scheduling section 114 executes steps ST70 to 111 explained in Embodiment 1. However, in this embodiment, following steps ST81 and 82 are executed after step ST80.

In step ST81, scheduling section 114 judges whether or not subcarrier pair $PB_{MAX}$ is selected as subcarrier pair $P_{MAX}$ out of subcarrier pairs $PA_{MAX}$ and $PB_{MAX}$. When subcarrier pair $PB_{MAX}$ is selected as subcarrier pair $P_{MAX}$ (ST81: YES), by transferring allocatable subcarriers having the same frequencies as allocated subcarriers of subcarrier pair $P_{MAX}$ from group A to group B, groups A and B are updated(step ST82). After the group update, the flow returns to step ST52. On the other hand, when subcarrier pair $PA_{MAX}$ is selected as subcarrier pair $P_{MAX}$ (ST81: NO), groups are not updated, and the flow returns to step ST52.

Next, a specific example of the operation of scheduling section 114 according to the above described operation steps will be explained using FIGS. 9A, 9B and 9C. Here, as shown in FIG. 9A, a case will be explained as an example where the allocated band of BS100a is the same as a part of the allocatable band of BS100b, subcarriers $f_1$ to $f_5$ are included in the allocated band and subcarriers $f_1$ to $f_{10}$ are included in the allocatable band.

Scheduling section 114 acquires reception quality information Qai of subcarriers $f_1$ to $f_5$ and reception quality information Qbj of subcarriers $f_1$ to $f_{10}$ and calculates quality differences DAij and DBij of each subcarrier pair Pij.

Figures 9A, 9B, 9C:
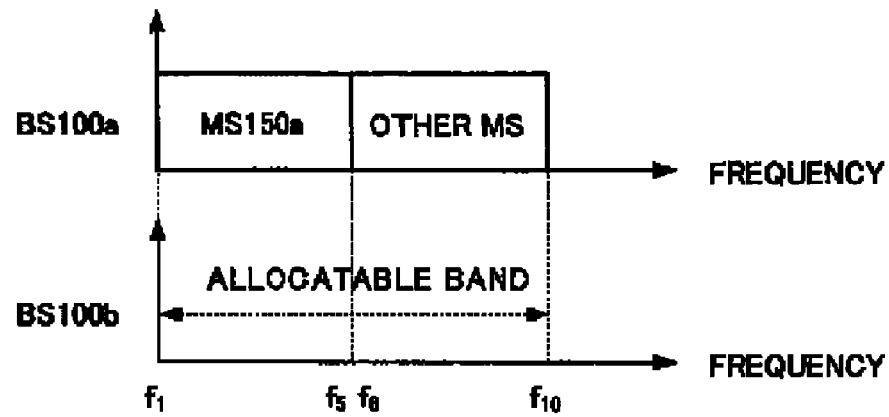
FIG. 9A illustrates a specific example of the operation of the scheduling section according to Embodiment 3 of the present invention.
FIG. 9B illustrates a specific example of the operation of the scheduling section according to Embodiment 3 of the present invention.
FIG. 9C illustrates a specific example of the operation of the scheduling section according to Embodiment 3 of the present invention.

As a result, as shown in FIG. 9B, quality difference DA55 of subcarrier pair P55 which corresponds to subcarrier $f_5$ is the largest among all calculated quality differences DAij and is 4. Furthermore, quality difference DB37 obtained by subtracting the value of reception quality information Qai corresponding to subcarrier $f_3$ from the value of reception quality information Qb7 corresponding to subcarrier $f_7$ is the largest among all calculated quality differences DBij and is 9.

Scheduling section 114 then compares quality difference DA55 and quality difference DB37. In this comparison, the value of quality difference DB37 is greater than the value of quality difference DA55, and therefore subcarrier pair P37 corresponding to quality difference D37 is selected as subcarrier $P_{MAX}$. That is, scheduling section 114 selects the allocated subcarrier (subcarrier $f_3$) of subcarrier pair P37 as the subcarrier to be deallocated and the allocatable subcarrier (subcarrier $f_7$) of subcarrier pair P37 as the subcarrier to be newly allocated.

In the above described example, the allocatable subcarrier (subcarrier $f_7$) of subcarrier $P_{MAX}$ belongs to group B. Therefore, when searching and selection of subcarrier pair $P_{MAX}$ are further continued, as shown in FIG. 9C, by transferring the allocatable subcarrier (subcarrier $f_3$) having the same frequency as the allocated subcarrier (subcarrier $f_3$) of subcarrier $P_{MAX}$ from group A to group B, groups A and B are updated. Quality differences DAij and DBij are then calculated again.

Consequently, according to this embodiment, scheduling section 114 searches subcarrier pairs $PA_{MAX}$ and $PB_{MAX}$ which maximize quality differences DAij and Dbij. Even when the allocated band overlaps with the allocatable band, the effect of compulsory handover in subcarrier units can be improved.

Furthermore, according to this embodiment, when a subcarrier pair comprised of an allocated subcarrier and an allocatable subcarrier having different frequencies is selected as subcarrier pair $P_{MAX}$, and, when an allocatable subcarrier having the same frequency as the allocated subcarrier of selected subcarrier pair $P_{MAX}$ exists, by transferring the allocatable subcarrier having the same frequency as the allocated subcarrier of subcarrier pair $P_{MAX}$ from group A to group B, groups A and B are updated. Therefore, when a plurality of subcarriers to be deallocated and subcarriers to be newly allocated need to be selected, it is possible to provide a wider range of selection and further improve the effect of compulsory handover.

Embodiment 4

Embodiment 4 of the present invention will be explained below. The configurations of the cellular system, BS and MS according to this embodiment are the same as those explained in Embodiment 1, and therefore explanations of the respective configurations will be omitted. This embodiment differs from Embodiment 1 only in the operation steps of scheduling section 114 executed to realize the operation (steps ST1 to 4) of the cellular system explained in Embodiment 1.

Figure 10:
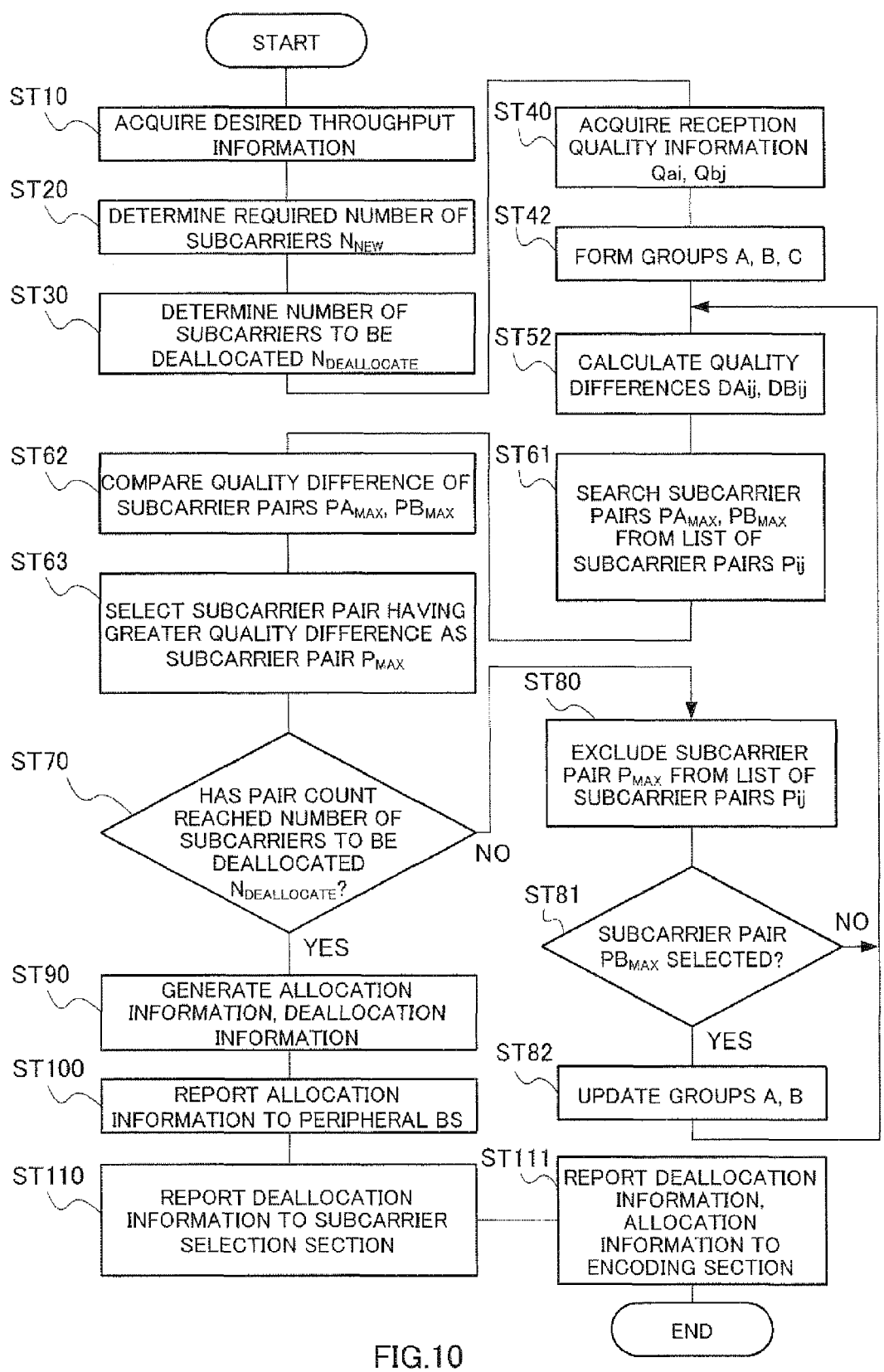
FIG. 10 is a flowchart illustrating operation steps of a scheduling section according to Embodiment 4 of the present invention.

To realize the above described operation in the cellular system, scheduling section 114 of BS100$a$ operates according to the steps which will be explained below. FIG. 10 is a flowchart illustrating an example of the operation steps of scheduling section 114. The operation steps in FIG. 10 are basically the same as the operation steps (FIG. 8) explained in Embodiment 3. The operation steps in FIG. 10 differ from the operation steps in FIG. 8 in that step ST42 is executed between step ST40 and step ST52.

In step ST42, three groups A, B and C are formed. Group A is formed with allocatable subcarriers having the same frequencies as any one of allocated subcarriers included in an allocated band. Furthermore, group B is formed with allocatable subcarriers having different frequencies from any allocated subcarriers included in the allocated band. Group C is formed with subcarriers included in a band other than an allocatable band.

Next, a specific example of the operation of scheduling section 114 according to the above described operation steps will be explained using FIGS. 11A, 11B and 11C. Here, as shown in FIG. 11A, a ease will be explained as an example where the allocated band of BS100$a$ is the same as a part of the allocatable band of BS100$b$, a band other than the allocatable band exists in the communication band of BS100$b$, subcarriers $f_1$ to $f_5$ are included in the allocated band, and subcarriers $f_1$ to $f_3$, $f_7$ to $f_{10}$ are included in the allocatable band.

Scheduling section 114 acquires reception quality information Qai of subcarriers $f_1$ to $f_5$ and reception quality information Qbj of subcarriers $f_1$ to $f_3$, $f_7$ to $f_{10}$ and calculates quality differences DAij and DBij about each subcarrier pair Pij.

Figures 11A, 11B, 11C:
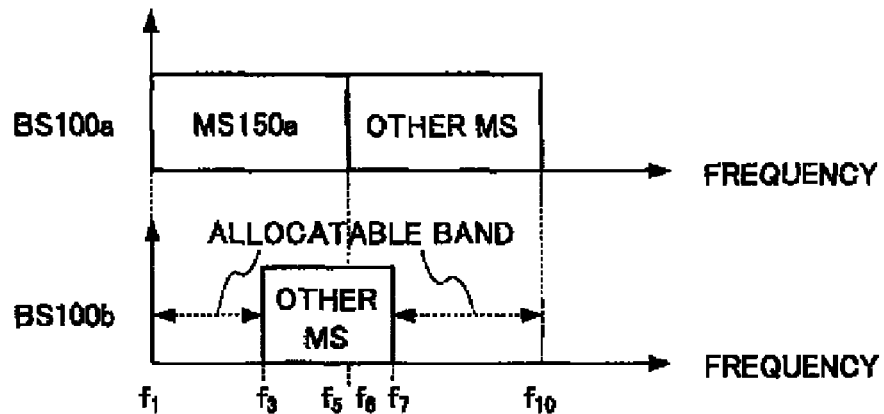
FIG. 11A illustrates a specific example of the operation of the scheduling section according to Embodiment 4 of the present invention.
FIG. 11B illustrates a specific example of the operation of the scheduling section according to Embodiment 4 of the present invention.
FIG. 11C illustrates a specific example of the operation of the scheduling section according to Embodiment 4 of the present invention.

As a result, as shown in FIG. 11B, quality difference DA33 of subcarrier pair P33 which corresponds to subcarrier $f_3$ is the largest among all calculated DAij and is 2. Quality difference DB37 obtained by subtracting the value of reception quality information Qa3 corresponding to subcarrier $f_3$ from the value of reception quality information Qb7 corresponding to subcarrier $f_7$ is the largest among all calculated quality differences DBij and is 9.

Scheduling section 114 compares quality difference DA33 and quality difference DB37. In this comparison, the value of quality difference DB37 is greater than the value of quality difference DA33, and subcarrier pair P37 corresponding to quality difference D37 is selected as subcarrier pair $P_{MAX}$. That is, the allocated subcarrier (subcarrier $f_3$) of subcarrier pair P37 is selected as the subcarrier to be deallocated, and the allocatable subcarrier (subcarrier $f_7$) of subcarrier pair P37 is selected as the subcarrier to be newly allocated.

In the above described example, the allocatable subcarrier (subcarrier $f_7$) of subcarrier pair $P_{MAX}$ belongs to group B. That is, when searching and selection of subcarrier pair $P_{MAX}$ are further continued, as shown in FIG. 11C, by transferring the allocatable subcarrier (subcarrier $f_3$) having the same frequency as the allocated subcarrier (subcarrier $f_3$) of subcarrier $P_{MAX}$ from group A to group B, groups A and B are updated. Quality differences DAij and DBij are then calculated again.

By this means, according to this embodiment, subcarrier pairs $PA_{MAX}$ and $PB_{MAX}$ which maximize quality differences DAij and DBij are searched, even when the allocated band partially overlaps with the allocatable band, the effect of compulsory handover in subcarrier units can be improved.

Furthermore, according to this embodiment, when a subcarrier pair comprised of an allocated subcarrier and an allocatable subcarrier having different frequencies is selected as subcarrier pair $P_{MAX}$, and, when an allocatable subcarrier having the same frequency as the allocated subcarrier of selected subcarrier pair $P_{MAX}$ exists, by transferring the allocatable subcarrier having the same frequency as the allocated subcarrier of subcarrier pair $P_{MAX}$ from group A to group B, groups A and B are updated. Therefore, when a plurality of subcarriers to be deallocated and subcarriers to be newly allocated need to be selected, it is possible to provide a wider range of selection and further improve the effect of compulsory handover.

Embodiment 5

Embodiment 5 of the present invention will be explained below. The configurations of the cellular system, BS and MS according to this embodiment are the same as explained in Embodiment 1, and therefore explanations of the configurations will be omitted. This embodiment differs from Embodiment 1 only in the operation steps of scheduling section 114 executed to realize the operation (steps ST1 to 4) of the cellular system explained in Embodiment 1.

Figure 12:
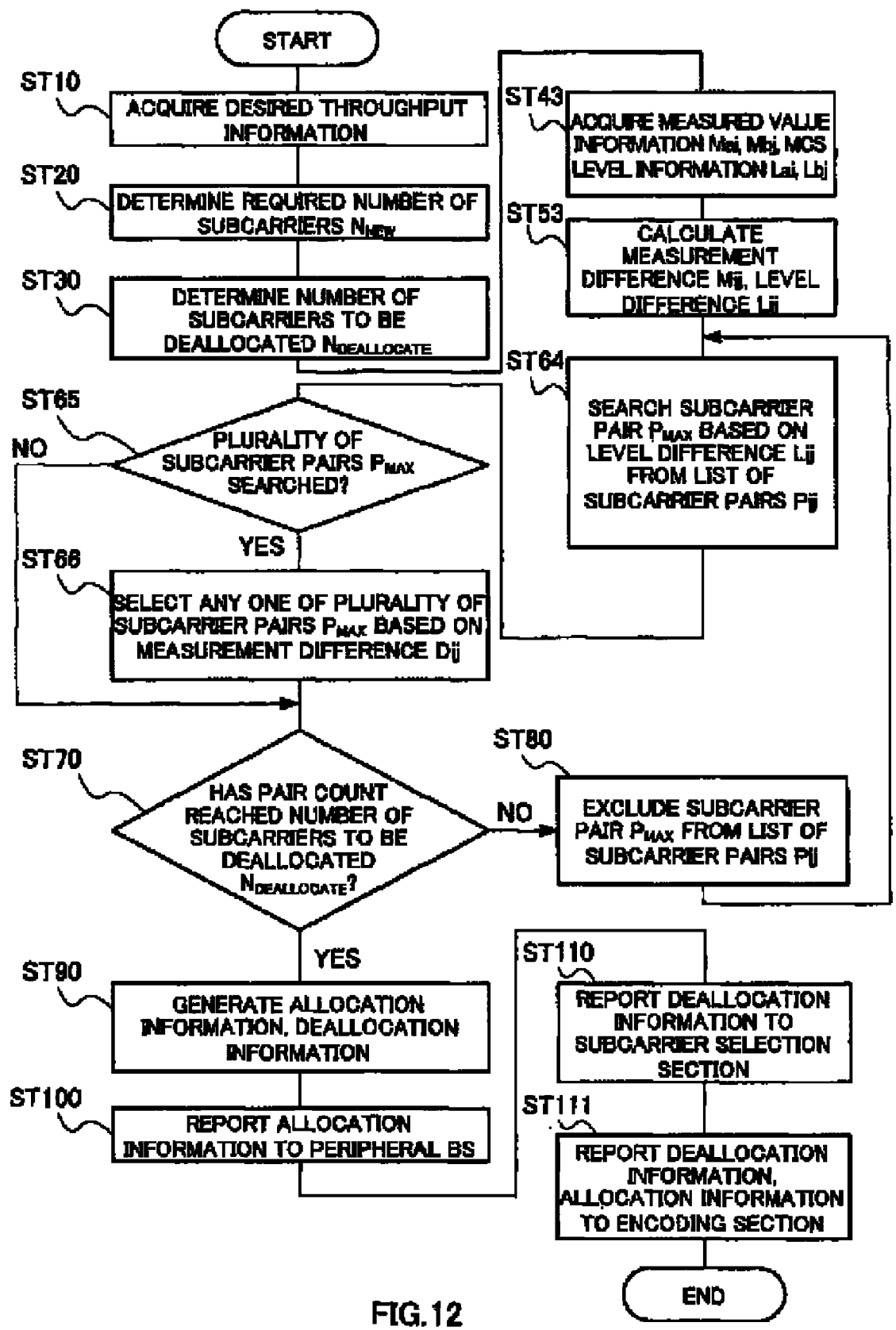
FIG. 12 is a flowchart illustrating operation steps of a scheduling section according to Embodiment 5 of the present invention.

Scheduling section 114 of BS100$a$ operates according to the steps which will be explained below to realize the above described operation in the cellular system. FIG. 12 is a flowchart illustrating an example of the operation steps of scheduling section 114.

First, steps ST10 to 30 explained in Embodiment 1 are executed.

In step ST43 after step ST30, as reception quality information Qai generated by MS150$a$, measured value information Mai indicating the measured value of the reception quality and MCS level information Lai indicating the MCS level corresponding to the measured value are acquired. As reception quality information Qbj generated by MS150a, measured value information Mbj indicating the measured value of the reception quality and MCS level information Lbj indicating the MCS level corresponding to the measured value are acquired.

Measurement difference Mij and level difference Lij corresponding to subcarrier pair Pij comprised of subcarriers $f_i$ and $f_j$ are calculated (step ST53). Both measurement difference Mij and level difference Lij can express how good the reception quality of sub carrier $f_j$ is, compared to the reception quality of subcarrier $f_i$.

In addition, in this embodiment, measurement difference Mij is obtained by subtracting the value of measured value information Mai from the value of measured value information Mbj. In this way, when, for example, measured value information Mai and Mbj express that the reception condition is better when the values indicated by measured value information Mai and Mbj become greater, measurement difference Mij can express how good the reception quality of subcarrier $f_j$ is, compared to the reception quality of subcarrier $f_i$.

When measured value information Mai and Mbj express that the reception condition is worse when the values indicated by measured value information Mai and Mbj become greater, measurement difference Mij may also be obtained by subtracting the value of measured value information Mbj from the value of measured value information Mai.

Furthermore, in this embodiment, level difference Lij is obtained by subtracting the value of MCS level information Lai from the value of MCS level information Lbi. In this way, when, for example, MCS level information Lai and Lbj express that the reception condition is better when the values indicated by MCS level information Lai and Lbj become greater, level difference Lij can express how good the reception quality of subcarrier $f_j$ is, compared to the reception quality of subcarrier $f_i$.

On the other hand, when MCS level information Lai, Lbj express that the reception condition is worse when the values indicated by MCS level information Lai and Lbj become greater, level difference Lij may also be obtained by subtracting the value of MCS level information Lbj from the value of MCS level information Lai.

Furthermore, in this embodiment, measurement difference Mij and level difference Lij are calculated from subcarrier pair Pij comprised of subcarriers $f_1$ and $f_j$ having the same frequency. This calculation method is preferably used when the allocated band of BS100a is the same as the allocatable band of BS100b.

In ST64 following step ST53, subcarrier pair $P_{MAX}$ having largest level difference Lij in the list of all subcarrier pairs Pij is searched.

When MCS level information Lai and Lbj express that the reception condition is worse when the values indicated by MCS level information Lai and Lbj become greater, subcarrier pair $M_{MIN}$ which has smallest level difference Lij may also be searched.

In step ST65 following step ST64, scheduling section 114 judges whether or not a plurality of subcarrier pairs $P_{MAX}$ are searched. When scheduling section 114 searches a plurality of subcarrier pairs $P_{MAX}$ (ST65: YES), the subcarrier pair having largest measurement difference Dij out of a plurality of searched subcarrier pairs $P_{MAX}$ is selected (step ST66). Moreover, in step ST66, a pair count is updated by adding 1 to the pair count when subcarrier pair $P_{MAX}$ having largest measurement difference Dij is selected. The flow then moves to processing in and after step ST70 explained in Embodiment 1. Here, the initial value of the pair count is 0.

When measured value information Mai and Mbj express that the reception condition is worse when the values indicated by measured value information Mai and Mbj become greater, subcarrier pair $M_{MIN}$ having smallest measurement difference Mij may also be selected.

On the other hand, when only one subcarrier pair $P_{MAX}$ is searched (ST65: NO), subcarrier pair $P_{MAX}$ is selected. Moreover, a pair count is updated by adding 1 to the pair count. The flow then moves to the processing in and after step ST70 explained in Embodiment 1.

Figure 13:
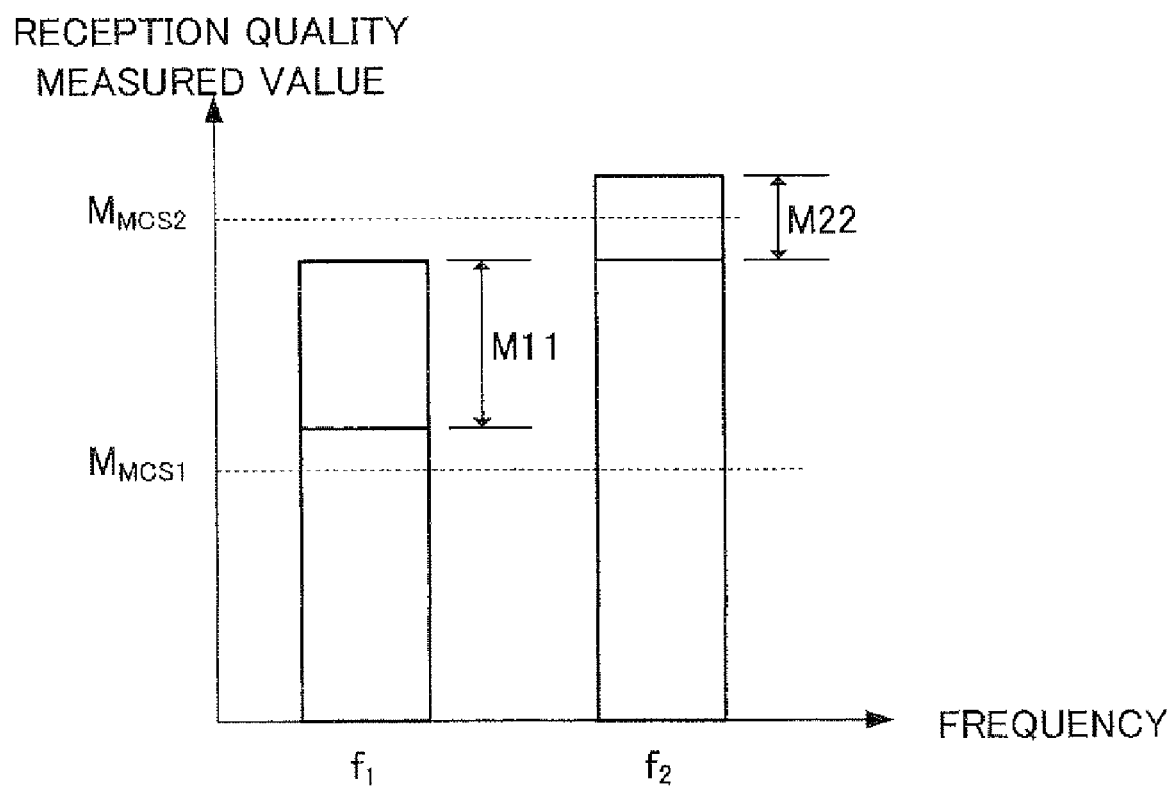
FIG. 13 illustrates a relationship between an MCS level and a reception quality measured value according to Embodiment 5 of the present invention.

By this means, according to this embodiment, measured value information Mai and Mbj and MCS level difference information Lai and Lbj are used together. The MCS levels may be the same, when the difference in the measured value of the reception quality is large, or the MCS level may be different when the difference in the measured value of the reception quality is small. In FIG. 13 showing a more specific example, measurement difference M11 corresponding to subcarrier $f_1$ is greater than measurement difference M22 corresponding to subcarrier $f_2$. However, although level difference L11 corresponding to subcarrier $f_1$ is 0 ($M_{MCS1}$-$M_{MCS1}$), the level difference L22 corresponding to subcarrier $f_2$ is greater than 0 ($M_{MCS2}$-$M_{MCS1}$). Consequently, by using a plurality of types of reception quality information concurrently, it is possible to improve the accuracy of selecting subcarrier pair $P_{MAX}$ (that is, selecting a subcarrier to be deallocated or a subcarrier to be newly allocated).

The embodiments of the present invention have been explained.

The multicarrier communication apparatus and the multicarrier communication method according to the present invention are not limited to each of the above described embodiments and can also be implemented with various modifications.

Figure 14:
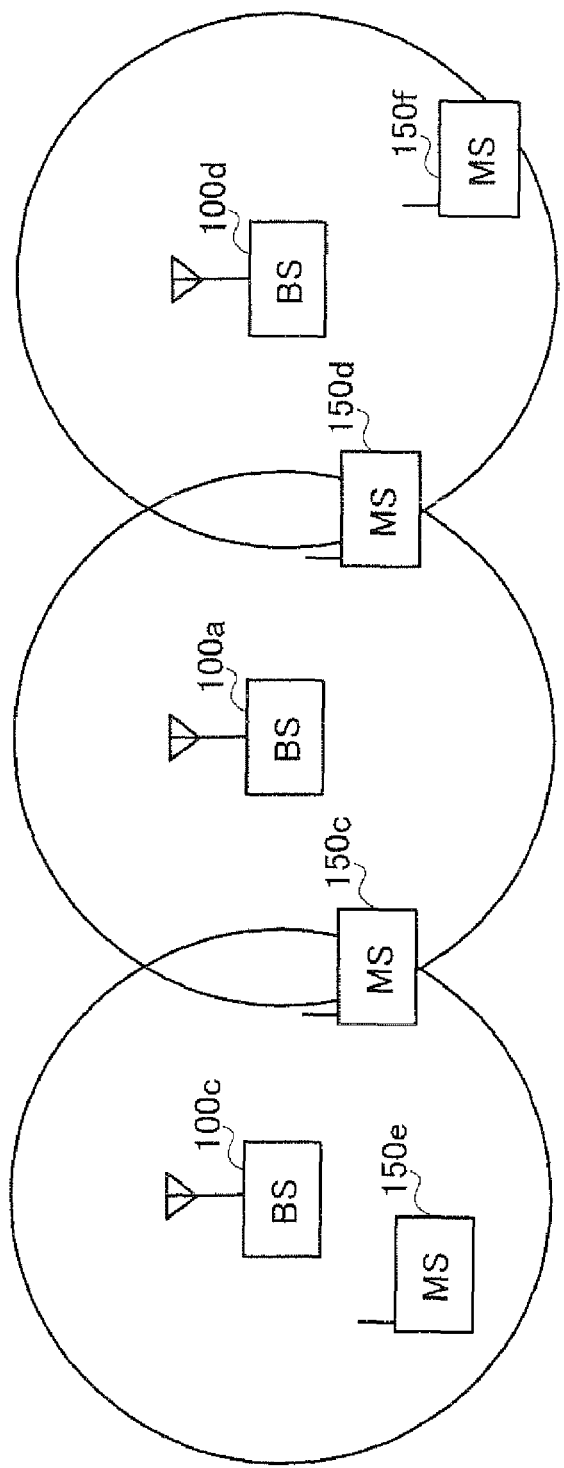
FIG. 14 illustrates the configuration of a cellular system according to a further embodiment of the present invention.

For example, the multicarrier communication apparatus and the multicarrier communication method may also be applied to the cellular system shown in. FIG. 14. In the cellular system shown in FIG. 14, BS100a explained in Embodiments 1 to 5 is communicating with MS150c and 150d. MS150c is located near the boundary between the cell of BS100a and the cell of BS100c, and MS150d is located near the boundary between the cell of BS100a and the cell of BS100d. BS100c is communicating with MS150e, and BS100d is communicating with MS150f.

When BS100a starts to communicate with other MS in such a communication state, BS100a can appropriately make MS150c and MS150d perform compulsory handover individually in subcarrier units according to the operation steps explained in any one of Embodiments 1 to 5.

Furthermore, each of the above described embodiments has explained the case where the multicarrier communication apparatus and the multicarrier communication method are applied to BS150a. However, the multicarrier communication apparatus and the multicarrier communication method may also be applied to a radio network control system which is a higher-level apparatus of BS.

Here, for example, the present invention has been explained taking the case where the present invention is configured by hardware, but the present invention may also be implemented by software. For example, by describing the multicarrier communication method algorithm according to the present invention in a programming language, storing this program in a memory and making an information processing section execute this program, it is possible to implement the same function as the multicarrier communication apparatus of the present invention.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-090814, filed on Mar. 28, 2005, the entire content of which is expressly incorporated by reference herein.

Industrial Applicability

The multicarrier communication apparatus and the multicarrier communication method of the present invention can be applied to a base station apparatus, a radio network control apparatus, and the like used in a cellular system in which a communication area is divided into a plurality of cells.

The invention claimed is:

1. A multicarrier communication apparatus comprising:
an acquisition section that acquires reception power values of any one of a plurality of allocated subcarriers already allocated from a first base station apparatus to a mobile station apparatus and any one of a plurality of allocatable subcarriers which a second base station apparatus can newly allocate to the mobile station apparatus;
a selection section that selects a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception power values; and
an instruction section that instructs the first base station apparatus to deallocate the selected first subcarrier and instructs the second base station apparatus to allocate the selected second subcarrier to the mobile station apparatus.

2. The multicarrier communication apparatus according to claim 1, wherein the selection section comprises:
a calculation section that calculates a difference between the reception power value of any one of the plurality of allocated subcarriers and the reception power value of any one of the plurality of allocatable subcarriers; and
a search section that searches the first subcarrier and the second subcarrier based on the calculated difference.

3. The multicarrier communication apparatus according to claim 2, wherein:
the calculation section calculates the difference by subtracting the reception power value of any one of the plurality of allocated subcarriers from the reception power value of any one of the plurality of allocatable subcarriers; and the search section searches a subcarrier pair which is comprised of the allocated subcarrier and the allocatable subcarrier and maximizes the calculated difference.

4. The multicarrier communication apparatus according to claim 3, wherein:
the calculation section calculates a difference of a same-frequency subcarrier pair which is comprised of the allocated subcarrier and the allocatable subcarrier having a same frequency; and
the search section searches a same-frequency subcarrier pair that maximizes the calculated difference.

5. The multicarrier communication apparatus according to claim 3, wherein:
the calculation section calculates a difference of a different-frequency subcarrier pair which is comprised of the allocated subcarrier and the allocatable subcarrier having different frequencies; and
the search section searches a different-frequency subcarrier pair that maximizes the calculated difference.

6. The multicarrier communication apparatus according to claim 3, wherein:
the plurality of allocatable subcarriers comprise a same-frequency subcarrier having a same frequency as any one of the plurality of allocated subcarriers and a different-frequency subcarrier having a different frequency from any one of the plurality of allocated subcarriers;
the calculation section subtracts the reception power value of an allocated subcarrier which has a same frequency as the same-frequency subcarrier from the reception power value of the same-frequency subcarrier to calculate a difference corresponding to the same-frequency subcarrier, and subtracts the reception power value of any one of the plurality of allocated subcarriers from the reception power value of the different-frequency subcarrier to calculate a difference corresponding to the different-frequency subcarrier; and
the search section searches a first subcarrier pair which maximizes the difference corresponding to the same-frequency subcarrier, searches a second subcarrier pair which maximizes the difference corresponding to the different-frequency subcarrier, compares a maximum value of the difference corresponding to the same-frequency subcarrier and a maximum value of the difference corresponding to the different-frequency subcarrier, and selects one of the searched first subcarrier pair and the searched second subcarrier pair according to the comparison result.

7. The multicarrier communication apparatus according to claim 3, wherein:
the allocatable subcarriers having a same frequency as any one of the plurality of allocated subcarriers form a first group, and the allocatable subcarriers having different frequencies from any one of the plurality of allocated subcarriers form a second group;
the search section transfers, when the allocatable subcarriers of the searched subcarrier pair are included in the second group, the allocatable subcarrier having a same frequency as the allocated subcarrier of the searched subcarrier pair from the first group to the second group to update the first group and the second group; and
the calculation section subtracts a reception power value of any one of the plurality of allocated subcarriers which form the updated first group from the reception power value of any one of the plurality of allocatable subcarriers which form the updated second group.

8. The multicarrier communication apparatus according to claim 3, wherein:

the acquisition section acquires a modulation coding scheme level and reception power measured value as reception power values;

the calculation section subtracts a modulation coding scheme level of any one of the plurality of allocated subcarriers from a modulation coding scheme level of any one of the plurality of allocatable subcarriers to calculate a first difference, subtracts a reception power measured value of any one of the plurality of allocated subcarriers from a reception power measured value of any one of the plurality of allocatable subcarriers to calculate a second difference; and the search section searches a subcarrier pair that maximizes the calculated first difference and selects, when a plurality of subcarriers pairs that maximize the first difference are searched, a subcarrier pair that maximizes the calculated second difference out of the plurality of searched subcarrier pairs.

9. A radio network control apparatus comprising the multicarrier communication apparatus according to claim 1.

10. A base station apparatus comprising:

an allocation section that allocates subcarriers to a mobile station apparatus;

an acquisition section that acquires reception power values of any one of a plurality of allocated subcarriers already allocated to the mobile station apparatus by the allocation section and any one of a plurality of allocatable subcarriers which another base station apparatus can newly allocate to the mobile station apparatus;

a selection section that selects a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception power values;

a deallocation section that deallocates the selected first subcarrier; and an instruction section that instructs the other base station apparatus to allocate the selected second subcarrier to the mobile station apparatus.

11. A multicarrier communication method comprising:

acquiring reception power values of any one of a plurality of allocated subcarriers already allocated from a first base station apparatus to a mobile station apparatus and any one of a plurality of allocatable subcarriers which a second base station apparatus can newly allocate to the mobile station apparatus;

selecting a first subcarrier out of the plurality of allocated subcarriers and a second subcarrier out of the plurality of allocatable subcarriers having a different frequency from any frequency of subcarriers other than the first subcarrier out of the plurality of allocated subcarriers based on the acquired reception power values; and instructing the first base station apparatus to deallocate the selected first subcarrier and instructing the second base station apparatus to allocate the selected second subcarrier to the mobile station apparatus.

* * * * *

UNITED STATES PATENT AND TRADEMARK OFFICE
CERTIFICATE OF CORRECTION

| | | |
|---|---|---|
| PATENT NO. | : 7,978,661 B2 | Page 1 of 1 |
| APPLICATION NO. | : 12/839238 | |
| DATED | : July 12, 2011 | |
| INVENTOR(S) | : Hidenori Matsuo et al. | |

It is certified that error appears in the above-identified patent and that said Letters Patent is hereby corrected as shown below:

Claim 8, column 18, line 67, incorrectly reads:

"claim 3, wherein;"

and should read:

"claim 3, wherein:"

Signed and Sealed this
Sixth Day of March, 2012

David J. Kappos
*Director of the United States Patent and Trademark Office*